(12) United States Patent
Caruhel et al.

(10) Patent No.: US 7,948,548 B2
(45) Date of Patent: May 24, 2011

(54) DIGITAL IMAGING DEVICE WITH INCLINATION SENSOR

(75) Inventors: Deny Caruhel, Tziel sur Seine (FR); Paolo Ciri, Houilles (FR)

(73) Assignee: IPG Electronics 504 Limited, Les Banques St. Peter Port ( * ) Notice: Subject to any disclaimer, the term of this patent is extended or adjusted under 35 U.S.C. 154(b) by 916 days.

(21) Appl. No.: 11/108,003

(22) Filed: Apr. 14, 2005

(65) Prior Publication Data
US 2005/0231600 A1  Oct. 20, 2005

(30) Foreign Application Priority Data
Apr. 19, 2004 (FR) .................................. 04 04104

(51) Int. Cl.
*H04N 5/222* (2006.01)
(52) U.S. Cl. ......... 348/333.02; 348/333.01; 348/333.04; 396/50
(58) Field of Classification Search ............. 348/208.15, 348/333.04, 333.03, 333.01
See application file for complete search history.

(56) References Cited

U.S. PATENT DOCUMENTS

| | | | |
|---|---|---|---|
| 5,557,358 A * | 9/1996 | Mukai et al. | 396/296 |
| 6,806,906 B1 * | 10/2004 | Soga et al. | 348/333.03 |
| 7,436,433 B2 * | 10/2008 | Mockler | 348/207.99 |
| 2002/0122121 A1 * | 9/2002 | Fujii et al. | 348/240 |
| 2003/0063200 A1 | 4/2003 | Isoyama | 345/239 |

FOREIGN PATENT DOCUMENTS

| | | | |
|---|---|---|---|
| EP | 1154314 A2 | * | 11/2001 |
| JP | 06096743 | | 5/1994 |
| JP | 7-306486 | | 11/1995 |
| JP | 07-306486 | * | 11/1995 |
| JP | 082181194 | | 10/1996 |
| JP | 2015041 | | 1/2002 |
| JP | 2079365 | | 3/2002 |
| JP | 2302197 | | 10/2002 |
| JP | 2003-280080 | | 10/2003 |

OTHER PUBLICATIONS

French Search Report dated Sep. 15, 2004.

* cited by examiner

*Primary Examiner* — Sinh Tran
*Assistant Examiner* — Paul Berardesca
(74) *Attorney, Agent, or Firm* — Marsh, Fischmann & Breyfogle LLP

(57) ABSTRACT

A digital imaging device comprises a screen so that a user can view a shot to be captured. One or more reference inclination lines are displayed on the viewing screen. The device also comprises an inclination sensor and displays on the screen one or more cursors mobile relative to the reference inclination line. The device further comprises a man-machine interface for controlling the movement of the reference inclination line. Thus the user can incline the imaging device to position the mobile cursor on one of the reference lines in order to orient his shot optimally. The reference inclination line(s) can also assist with framing the shot.

7 Claims, 2 Drawing Sheets

DIGITAL IMAGING DEVICE WITH INCLINATION SENSOR

The present invention claims foreign priority on French Patent Application 04 04 104, filed Apr. 19, 2004.

BACKGROUND OF THE INVENTION

1. Field of the Invention

The present invention relates to a digital imaging device such as digital still camera or digital video camera.

2. Description of the Prior Art

A device of the above kind incorporates an image sensor consisting of semiconductor materials and producing images directly in digital form. The image sensor in a digital imaging device replaces the film of conventional still cameras and video cameras.

This type of digital device has become very common in recent years. Users of digital still cameras can in particular view on a screen the digital image captured by the image sensor and decide whether or not to validate the photo to store it in the memory of the device. Real-time viewing of the image captured by the still camera limits spoiled shots.

However, digital imaging devices provide no visual assistance with the inclination and framing of the shot. Thus some photos may have an undesirable inclination to the line of the horizon, which is not necessarily detected by the user when viewing them on the screen of the device. In particular, when the shot is a landscape, for example a seascape, alignment with the line of the horizon is difficult to achieve visually.

Some conventional still cameras have visual aids for the inclination of the lens. Such means generally consist of vials integrated into the still camera and provide a measurement of the inclination of the lens to the horizontal.

There are also tripods for digital video cameras incorporating vials for adjusting the inclination of the video camera.

Such devices can be found on the following Internet site, for example:

http://www.arnaudfrichphoto.com/gp_recadrage_access.htm.

The above prior art systems are mechanical, costly and bulky.

Mechanical systems of the above kind for indicating inclination of the still camera cannot be transposed to a digital still camera without considerably increasing its weight. At present, no means for indicating inclination of the lens are provided on digital still cameras.

The invention proposes to fill this gap and proposes a digital imaging device enabling checking of the inclination of the lens.

SUMMARY OF THE INVENTION

The invention consists in a digital imaging device that comprises a screen for viewing a shot, on which one or more reference inclination lines are displayed, an inclination sensor adapted to display on the screen one or more cursors mobile relative to the reference inclination line, and a man-machine interface adapted to control the movement of the reference inclination line.

In one embodiment, one or more mobile vertical lines and/or one or more mobile horizontal lines are displayed on the viewing screen.

According to one feature, the man-machine interface is adapted to control the movement of the one or more vertical lines and/or horizontal lines parallel to the edges of the screen.

According to one feature, the man-machine interface is adapted to control rotation of said one or more reference inclination lines.

In one embodiment the mobile cursor comprises one or more mobile inclination lines adapted to coincide with at least one reference inclination line displayed on the screen.

In one embodiment the mobile cursor comprises one or more mobile spots adapted to be placed on one or more reference inclination line displayed on the screen.

In one embodiment a plurality of fixed horizontal lines and a plurality of fixed vertical lines are displayed on the viewing screen to form a grid.

According to one feature, one or more fixed horizontal lines and one or more fixed vertical lines are placed at the center of the height and at the center of the width of the screen, respectively.

According to one feature, one or more fixed horizontal lines and one or more fixed vertical lines are placed at the delimitation of one-third of the height and one-third of the width of the screen, respectively.

Features and advantages of the invention will emerge more clearly on reading the following description, which is given by way of illustrative and non-limiting example and with reference to the appended drawings.

DETAILED DESCRIPTION OF THE PREFERRED EMBODIMENTS

The digital imaging device of the invention comprises a screen so that a user can view the shot to be captured. One or more reference inclination lines are displayed on the viewing screen. The expression "reference inclination line" means a horizontal or vertical line or a given diagonal. The device of the invention also comprises an inclination sensor adapted to display on the screen one or more cursors mobile relative to said reference inclination line.

Thus the user can incline the imaging device to position the mobile cursor on one of the reference inclination lines in order to orient his shot optimally. The reference inclination line(s) can also assist with framing the shot.

Figure 1:
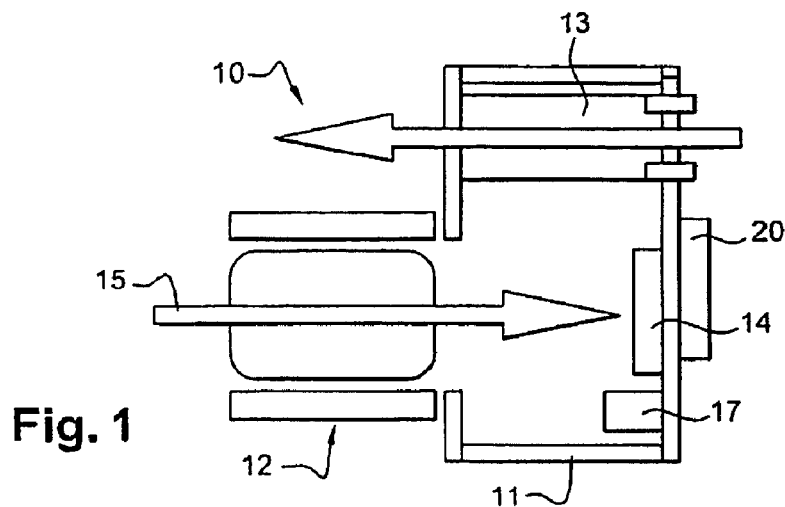
FIG. 1 is a schematic of a digital imaging device of the invention.

The device of the invention is described more specifically with reference to FIG. 1.

The device 10 of the invention is a digital imaging device. It can be a still camera or a camcorder or any other device adapted to capture images and retranscribe them digitally into a memory.

A device 10 of the above kind is known in the art and includes, inter alia, a casing 11 in which are disposed processing electronics and a lens 12 including focusing lens elements. A viewfinder 13 is provided in the casing 11 to enable a user to sight the subject of the shot.

The casing 11 also includes an image sensor 14 such as a Charge-Coupled Device (CCD) or Charge-Injection Device (CID) sensor. A sensor of the above kind includes a matrix of photosensitive semiconductor elements responding to luminous stimuli by generating an electrical signal. The image sensor 14 receives a light beam 15 coming from the elements of the lens 12 and transmits an electrical signal representative of the received illumination pixel by pixel to an electronic processing device, not shown, such as a microprocessor.

The device 10 also includes a viewing screen 20 on which the electronic processing unit can display the image captured by the image sensor 14. In certain designs of device, the screen 20 can replace the viewfinder 13 because the user can view his shot on the screen and decide whether or not to store the shot displayed in the memory.

The device 10 of the invention further includes an inclination sensor 17 disposed in the casing 11 and connected to the processing electronics of the device. The inclination sensor 17 is adapted to produce a signal representative of the inclination of the image sensor 14 to a reference line, for example the line of the horizon.

The inclination sensor 17 can be an inclinometer. An inclinometer is able to detect alignment with a fixed inclination line, generally a horizontal or vertical line. A sensor of this kind can be installed in a small device such as a digital imaging device.

In one embodiment, the inclinometer may consist of two or more parallel and partially conductive solid plates. First and second non-miscible insulative materials are disposed between the plates. The first material has a higher dielectric constant than the second material. The first and second materials can be non-miscible liquids with different densities or a liquid and a gas that is not miscible in said liquid.

The plates and the dielectric materials form a capacitor of variable capacitance. According to the inclination of the inclination sensor, and thus of the image sensor, the distribution of the materials between the plates changes and modifies the capacitance of the inclinometer to produce a signal representative of the inclination of the image sensor to a fixed inclination reference line. For example, the first material can be a liquid such as glycol and the second material can be any inert gas.

The inclinometer can include more than two plates in order to detect inclinations over 360°.

The inclination sensor 17 can equally consist of a microelectromechanical (MEM) system. An MEM system can include an accelerometer and/or a gyroscope. The force of gravity may cause a mechanical displacement depending on the inclination of the MEM system that induces an electrical signal representative of the acceleration of the mobile mechanical element.

Any other inclination sensor technology may be envisaged in the context of the present invention, provided that the sensor technology enables sufficient miniaturization for incorporation into a digital imaging device. In particular, the inclination sensor may be a Surface-Mount Device (SMD) mounted on a printed circuit board.

Figure 2:
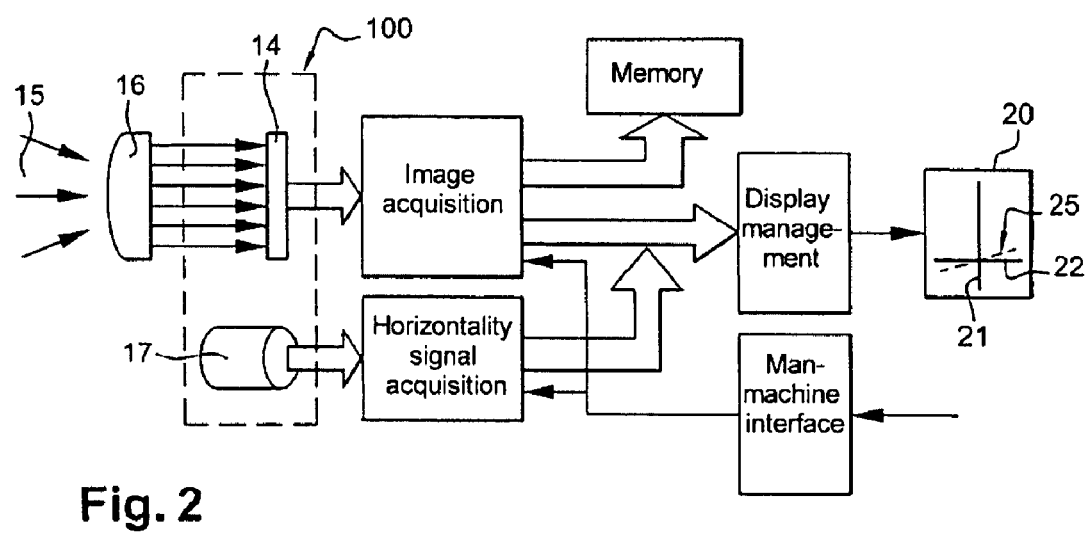
FIG. 2 is a schematic of acquisition of a shot by the FIG. 1 device.

The FIG. 2 block diagram shows the acquisition of a shot by a device 10 of the invention.

Light 15 coming from the object to be shot is focused by a lens element 16 of the lens 12 of the device 10 onto the image sensor 14 that provides image acquisition data in the manner known in the art. The inclination sensor 17 furthermore produces an inclination signal. The inclination sensor 17 and the image sensor can in addition be physically disposed in the same plane 100 inside the casing 11 of the device 10.

The electronic processing unit of the device thus receives image acquisition data and signal inclination acquisition data from an inclination signal. The image data is stored in a memory and transmitted to a display management unit connected to the viewing screen 20.

The electronic unit processes the inclination signal supplied by the sensor 17 and sends a reference inclination signal to the display management unit. The inclination sensor can thus detect inclination to the horizontal and the processing unit can then convert its signal into a reference line to be displayed and that may be a horizontal, vertical or diagonal line.

The viewing screen 20 is thus adapted to display the image captured by the lens of the imaging device and an element representing the inclination of the shot. The screen 20 of the device of the invention displays one or more reference inclination lines 21 and one or more mobile cursors 25.

In the embodiment shown in FIG. 2, the screen 20 displays a fixed vertical line 21, a fixed horizontal line 22 and a mobile inclination line 25 representing the inclination signal from the image sensor 14. In this embodiment, the image of the shot is correctly aligned with the horizon if the mobile line 25 coincides with the fixed horizontal line 22.

Figure 3:
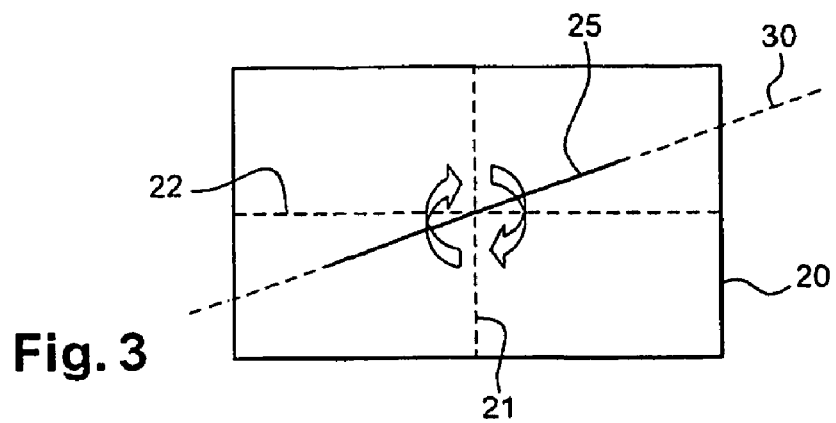
FIG. 3 is a diagram of a viewing screen conforming to a first embodiment of the invention.
Figure 4:
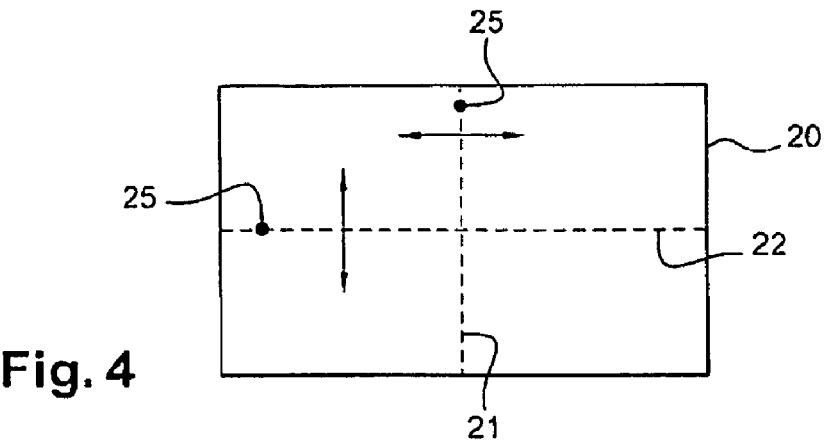
FIG. 4 is a diagram of a viewing screen conforming to a second embodiment of the invention.
Figure 5:
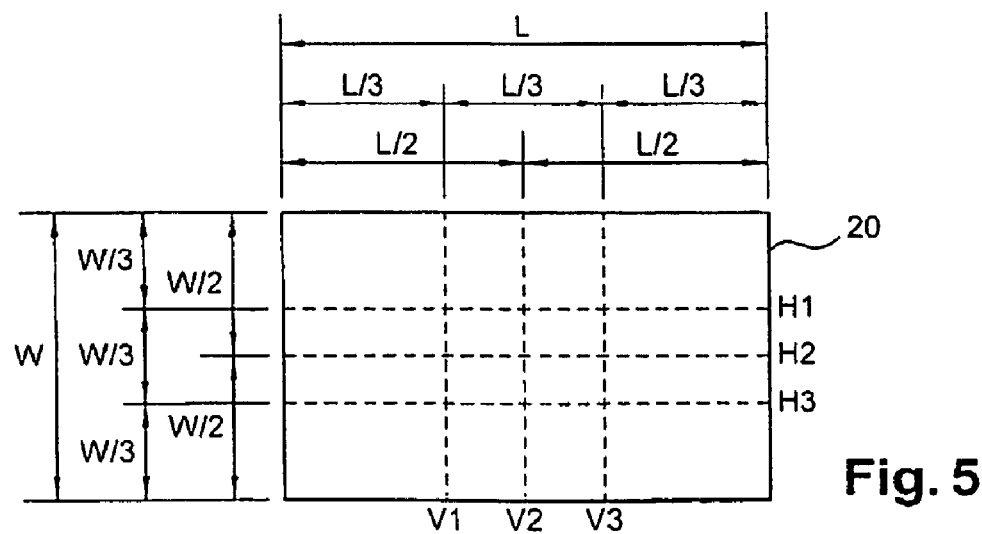
FIG. 5 is a diagram of a viewing screen conforming to a third embodiment of the invention.

FIGS. 3 to 5 show embodiments of the inclination indicator means of the imaging device.

In all cases, the digital imaging device includes a screen 20 for viewing the shot and on which one or more reference inclination lines 21, 22 are displayed and an inclination sensor 17 adapted to display on the screen 20 one or more cursors 25 mobile relative to said reference inclination line 21, 22. The reference inclination lines are shown vertical and/or horizontal hereinafter, but it is to be understood that they can be diagonal.

In a first embodiment, shown in FIG. 3, a vertical line 21 and a horizontal line 22 are displayed on the viewing screen 20. The mobile cursor 25 consists of a mobile inclination line corresponding to the horizon line 30. The mobile line 25 is adapted to coincide with the horizontal line 22. It is to be understood that the mobile cursor 25 can equally be a mobile inclination line adapted to coincide with the vertical line 21. It is also to be understood that just a horizontal line 22 can be displayed on the screen 20 with a mobile cursor 25 consisting of a mobile line adapted to coincide with the horizontal line 22 or that just a vertical line 21 can be displayed on the screen 20 with a mobile cursor 25 consisting of a mobile line adapted to coincide with the vertical line 22.

In a second embodiment, shown in FIG. 4, a vertical line 21 and a horizontal line 22 are displayed on the viewing screen 20. The mobile cursor 25 consists of two mobile spots adapted to be placed on the horizontal line 22 and on the vertical line 21, respectively. It is to be understood that the mobile cursor 25 can consist of a single mobile spot adapted to be placed on one of the fixed inclination lines 21, 22.

It is also to be understood that the mobile cursor 25 may comprise one or more mobile inclination lines, as in FIG. 3, and one or more mobile spots, as in FIG. 4, but this would tend to overburden the viewing screen 20, to the detriment of the image of the shot to be viewed.

Depending on the embodiment, the reference inclination lines 21, 22 may be fixed on the screen 20, for example at the center of the width and the height of the screen, or mobile on the screen, for example mobile parallel to the edges of the screen. To this end, a man-machine interface can include controls for moving a fixed inclination line 21, 22 for placing it on a marker of the image of the shot to be captured. For example, a cliff edge can be aligned with a mobile vertical line placed in a lateral portion of the screen. Thus the fixed inclination lines 21, 22 can be used not only to check the inclination of the image to the horizontal but also to center the image relative to certain objects in the shot to be captured.

In one embodiment, the reference inclination lines can be mobile in inclination. To this end, a man-machine interface can include controls for applying rotation to a reference inclination line 21, 22 in order to place it on a marker of the image of the shot to be captured, for example for aerial views or for any other requirement of the photographer. A control of this kind for rotating the reference inclination line can also be used to change from a horizontal reference line display mode to a vertical reference line display mode.

In the embodiment shown in FIG. 5, a plurality of fixed horizontal lines and a plurality of fixed vertical lines are displayed on the viewing screen to form a grid. At least one of these lines preferably constitutes the fixed inclination line 21, 22 relative to which the mobile cursor 25 is positioned.

The grid formed by this plurality of fixed vertical lines v1, v2, v3 and fixed horizontal lines h1, h2, h3 is used to center the image relative to certain objects in the shot to be captured and can thus replace the fixed inclination lines mobile relative to the edges of the screen described above.

In the embodiment shown in FIG. 5, one or more fixed horizontal lines h2 and one or more fixed vertical lines v2 are placed at the center W/2 of the height W and at the center L/2 of the width L of the screen 20, respectively. Furthermore, one or more fixed horizontal lines h1, h3 and one or more fixed vertical lines v1, v3 are placed on the delimitation of one-third W/3 of the height W and one-third L/3 of the width L of the screen 20, respectively. This disposition of the fixed vertical and horizontal lines meets most of the framing requirements of professional photographers.

Thus the invention proposes an imaging device enabling optimum control of the inclination and framing of the shot by a user.

The invention claimed is:

1. A digital imaging device comprising:
an image sensor configured to capture an image incident thereon;
an inclination sensor configured to determine an inclination of the image sensor relative to at least one reference inclination of the image sensor;
a display configured to display the image captured by the image sensor, a representation of the reference inclination and a representation of the inclination of the image sensor relative to the at least one reference inclination of the image sensor, the representation of the inclination of the image sensor being one or more mobile lines offset with respect to the representation of the reference inclination by an angle representing the inclination of the image sensor relative to the at least one reference inclination of the image sensor;
further comprising a control unit configured to control the display to move the representation of the reference inclination to align the representation of the reference inclination with a substantially linear aspect of the displayed image;
wherein the representation of the reference inclination is a linear representation, and the control unit is configured to control the display to rotate the linear representation about its midpoint.

2. The digital imaging device of claim 1, further comprising a man-machine interface configured to receive an instruction to move the representation of the reference inclination, the control unit being further configured to control the display to move the representation of the reference inclination responsive to receiving the instruction.

3. The digital imaging device of claim 1, wherein the representation of the reference inclination is at least one of a horizontal line and a vertical line.

4. The digital imaging device of claim 1, wherein the one or more mobile lines intersect the representation of the reference inclination at a midpoint of the representation of the reference inclination.

5. An image display device comprising:
an image sensor configured to capture an image incident thereon;
an inclination sensor configured to determine an inclination of the image sensor relative to at least one reference inclination of the image sensor; and
a display coupled to the image sensor and the inclination sensor, the display being configured to display the image captured by the image sensor, a representation of the reference inclination and a representation of the inclination of the image sensor relative to the at least one reference inclination of the image sensor, the representation of the inclination of the image sensor being one or more mobile lines offset with respect to the representation of the reference inclination by an angle representing the inclination of the image sensor relative to the at least one reference inclination of the image sensor;
further comprising a control unit configured to control the display to rotate the representation of the reference inclination to align it with an aspect of the image;
wherein the representation of the reference inclination is a linear representation, and a control unit is configured to control the display to rotate the linear representation about its midpoint.

6. The image display device of claim 5, further comprising a man-machine interface configured to receive an instruction to rotate the representation of the reference inclination, the control unit being further configured to control the display to rotate the representation of the reference inclination responsive to receiving the instruction.

7. The image display device of claim 5, wherein the one or more mobile lines intersect the representation of the reference inclination at a midpoint of the representation of the reference inclination.

* * * * *